United States Patent [19]

Tiitola

[11] 4,259,274
[45] Mar. 31, 1981

[54] METHOD AND APPARATUS FOR MAKING A LAMINATED SKI

[75] Inventor: Antti-Jussi Tiitola, Tampere, Finland

[73] Assignee: Karhu-Titan Oy, Finland

[21] Appl. No.: 958,170

[22] Filed: Nov. 6, 1978

Related U.S. Application Data

[63] Continuation-in-part of Ser. No. 732,335, Oct. 14, 1976, abandoned.

[30] Foreign Application Priority Data

Oct. 15, 1975 [FI] Finland .................................. 752865

[51] Int. Cl.³ .............................................. B29D 27/04
[52] U.S. Cl. ...................................... 264/46.5; 264/51; 264/101; 264/261; 264/331.11; 280/610; 425/123; 425/451.9; 425/817 R
[58] Field of Search ................... 264/46.5, 46.6, 46.7, 264/46.8, 46.4, 101, DIG. 83, 261, 328, 51, 331; 425/123, 451.9, 817 R; 280/610

[56] References Cited

U.S. PATENT DOCUMENTS

| | | | |
|---|---|---|---|
| 3,090,078 | 5/1963 | Ackles | 264/46.5 |
| 3,256,132 | 6/1966 | Williams | 264/46.6 |
| 3,733,380 | 5/1973 | Ishida | 264/46.5 |
| 3,816,573 | 6/1974 | Hashimoto et al. | 264/46.5 |
| 3,833,454 | 9/1974 | Ambrose | 264/46.4 |
| 3,958,810 | 5/1976 | Böhm | 264/46.5 X |

FOREIGN PATENT DOCUMENTS 1807225  7/1970  Fed. Rep. of Germany .......... 264/46.5

*Primary Examiner*—Philip Anderson
*Attorney, Agent, or Firm*—Steinberg & Raskin

[57] ABSTRACT

A ski which has a sandwich structure including upper and lower plastic laminations and a foamed plastic core situated therebetween with dense side portions integral with the upper and lower laminations and forming a shell surrounding the foamed core has in its new finished condition the same condition as when the ski is removed from a mold, so that finishing operations are not required subsequent to removal of the ski from the mold. The mold which is used to manufacture the ski has opposed relatively wide walls and a pair of opposed relatively narrow walls which are permanently fixed to one of the relatively wide walls while the other of the relatively wide walls is movable to and from an operating position closing the mold and cooperating with the relatively narrow walls for this purpose. The relatively wide walls have inner surfaces directed toward the interior of the mold to define part of the mold cavity, and against these inner surfaces the upper and lower laminations of the ski are held by a suitable holding structure so that the foamable plastic can be injected into the mold between the upper and lower laminations to become bonded integrally therewith while forming the dense side portions along the inner surfaces of the relatively narrow mold walls. According to the method, the mold downwardly extends in its longitudinal forward direction at an angle to the horizontal so that gravity forces can be employed in order to promote a complete filling of the core space within the mold with foamable plastic material. The upper lamination of the ski, which preferably is narrower than the lower lamination thereof, is first placed in the mold, after being completely finished, while being held in place by an adhesive tape which in addition to holding this upper lamination in the mold serves to protect the finish thereof, the lower ski lamination being situated against the inner surface of the movable mold wall and held thereagainst during the injection of the foamable plastic. According to the method, when the foamable plastic has cured to form the core, the ski structure is removed from the mold, and no further surface-finishing operations are required.

16 Claims, 7 Drawing Figures

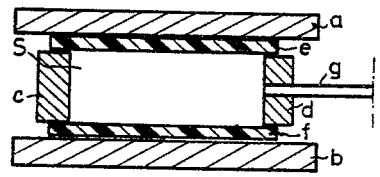
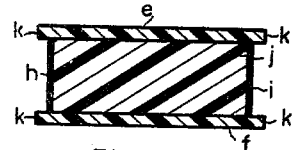
FIG. 5 PRIOR ART
FIG. 6 PRIOR ART
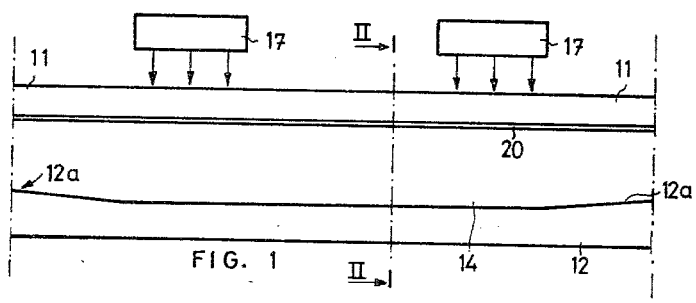
FIG. 1
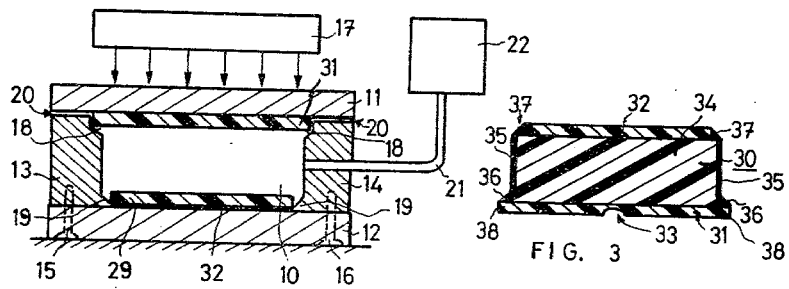
FIG. 2
FIG. 3
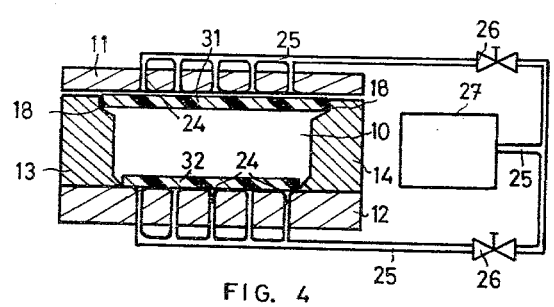
FIG. 4

METHOD AND APPARATUS FOR MAKING A LAMINATED SKI

BACKGROUND OF THE INVENTION

This application is a continuation-in-part of Application Ser. No. 732,335, filed Oct. 14, 1976, now abandoned.

The present invention relates to a method and apparatus for manufacturing skis.

In particular, the present invention relates to a method and apparatus for manufacturing that type of ski which has upper and lower plastic laminations with a foamed plastic core situated therebetween to form a so-called sandwich structure. This ski structure thus has a relatively light core, while the upper and lower plastic laminations may be made of a suitably reinforced plastic at least at the load-bearing portions thereof.

With respect to the apparatus of the invention, this apparatus relates particularly to a mold for manufacturing the ski, this mold having a pair of opposed relatively wide walls forming a bottom wall and a covering wall for the mold while the mold also has a pair of relatively narrow side walls defining with the relatively wide walls the interior mold cavity corresponding to the cross-sectional configuration of the finished ski. The upper and lower ski laminations are situated respectively against the inner surfaces of the relatively wide walls, being fixed thereto during the molding operation when a foamable plastic is injected into the space between the relatively narrow side walls and between the upper and lower laminations which are fixed to the relatively wide mold walls at the inner surfaces thereof, respectively.

The method of the invention involves the use of a mold of the above type to manufacture a ski of the above type, this method involving the manner in which the upper and lower ski laminations are placed in the mold and then foamable plastic the injected into the mold in order to form between these laminations the foamed plastic core of the finished ski.

In recent times skis having a sandwich structure of the type referred to above have become increasingly popular, such skis including a relatively light core part made, for example, of wood, foamed plastic, or equivalent materials, while on both sides of this core there are the load-bearing surface laminations of the ski consisting, for example, of a reinforced plastic material suitable for its intended purpose or of metal or another suitable material having a high enough modulus of elasticity.

In the case where foamed plastic is used to form the core which in effect forms a spacer between the upper laminations of the ski, it is known, according to the prior art practice, first to cast or otherwise to finish-machine a core piece having accurate dimensions. Then the upper and lower ski laminations which form the load-bearing elements of the ski are cemented to the upper and lower surfaces of the previously finished core in a special ski press.

In addition, there is known ski-manufacturing methods according to which the foamed plastic intended to form the core is injected into a special mold having walls to which the upper and lower load-bearing ski laminations have already been fixed so that the injection of the foamable plastic takes places in the space between these laminations. With this latter type of manufacture, those surfaces of the load-bearing laminations which are directed toward each other and between which the foamable plastic is injected are preliminarily given such a treatment that the foaming plastic, as it solidifies, forms a secure bond with these laminations. In addition, upon making use of a foamable plastic material of suitable quality, the outer portions of the foamed plastic core will have a dense structure with the greater part of the cells of the foamed plastic core being situated in the space surrounded by this dense outer structure of the core. In this way the foamed plastic core will have at its exterior regions a material the specific gravity of which is equal to that of the basic plastic material, while the interior central part of the foamed plastic core will be made up of the cellular material having a specific gravity less than that at the outer regions of the core. In other words, the foamed plastic forms a crust at the region of its outer surface, and such a crust or relatively dense outer portion of the foamed core has been found to be particularly advantageous in connection with the manufacture of skis. By utilizing this latter property of the foamed core in a proper way and practice, it is possible to gain not only the advantage of a stepwise transition of stresses from the light-weight core to the load-bearing outer surface layers, but also there will be provided at the sides of the ski a shell having good strength characteristics and thus affording at the same time a protection for the ski.

While these latter characteristics of a foamed plastic core do indeed provide certain adavantages set forth above, the fact is that in practice the use of such construction has been extremely limited because when a ski with a foamed plastic core is manufactured according to conventional techniques, highly disadvantageous finishing operations are essential. These finishing operations not only are difficult and expensive, but in addition unless extreme care is exercised, the ski easily becomes finished in such a way that the advantages of a foamed plastic core are minimized in a highly undesirable manner. Thus, because of these problems involved in connection with the use of a foamed plastic core, in practice a ski having such a construction is not used to any great extent.

Additionally, other methods are known for manufacturing a laminated ski wherein foamed plastic is injected into the space defined between the upper and lower ski laminations thereby simultaneously bonding the upper and lower laminations to the formed core. Thus, for example, according to a method taught in U.S. Pat. No. 3,816,573 granted June 11, 1974 to Hashimoto, et al., a lower plate or lamination is located within the mold cavity against the internal surface of the lower wide mold wall. A H-shaped spacer is then located within the mold cavity so that the lower edges of the spacer webs abut against the lower plate. The upper plate is then located between the inner surfaces of the mold side walls against the upper edges of the spacer webs so that the upper and lower plates are separated by a predetermined distance. The mold is then covered by a top cover which is bolted to the upper edges of the mold side walls. However, such a method which employs the above described mold structure is not entirely advantageous for several reasons. Thus, it is possible for the foamable plastic material injected into the mold space between the upper and lower plates to enter into the small intersticial spaces present between the outer surfaces of the upper and lower plates and the internal surfaces of the wide lower wall and top cover. Thus, since the location of the upper plate is determined by the dimensions of the spacer, and the mold top cover is sealingly affixed to the upper ends of the mold side walls, it is possible that the lower surface of the top mold cover will not flushly contact the upper surface of the upper plate thereby allowing foamable plastic material to enter into the space defined therebetween. Furthermore, due to unavoidable slight waviness or lack of flatness of the plate and lower mold wall, small spaces will be present therebetween into which the foamable plastic material can enter. In such case, it is necessary to perform further finishing operations on the ski in order to clear the outer surfaces of the plates of foamed plastic material. An additional disadvantage in the practice of this prior art method is that in view of the closure structure of the mold, which is fixed to the upper edges of the mold side walls, the upper plate may not be positively held down against the spacer over its entire periphery and, therefore, it is possible for the upper plate to move away from the spaces during foaming and curing of the foamable plastic material.

It is also a problem in manufacturing skis of the laminated type having a foamed core construction that during manufacturing, the foamable plastic material does not enter into the extremities of the core space so that casting defects in the form of cavities present in the foam core are often present in the finished ski. In such cases, the outer laminations are not supported in the area of these casting defects thereby resulting in the formulation of stress concentrations in the vicinity thereof which in turn increase the possibility of rupture of the ski during use.

SUMMARY OF THE INVENTION

It is accordingly a primary objective of the present invention to provide a method and apparatus for manufacturing a ski which retains all of the above advantages resulting from the use of the foamed plastic core with the ski of the invention having a construction according to which it is far less expensive to manufacture than conventional skis having a foamed plastic core while at the same time avoiding the above drawbacks.

It is also an object of the present invention to provide a ski-manufacturing apparatus, in particular a mold, and structure associated therewith, which can be used in a highly effective manner for manufacturing a ski of the above type while avoiding the above drawbacks.

It is also an object of the present invention to provide a ski-manufacturing method which enables a ski to be manufactured in a highly effective but at the same time simple and inexpensive manner achieving a high quality ski at low cost.

A particular object of the present invention is to provide a method and apparatus according to which when a ski is removed from a mold further finishing operations are not required.

Thus, it is an object of the present invention to provide a ski as well as a ski-manufacturing method and apparatus which enables a foamed plastic core to be used while retaining all the advantages of such a foamed plastic core with elimination of the above drawbacks.

The ski manufactured according to the method and apparatus of the invention has between its upper and lower laminations the foamed plastic core portion provided with the dense side portions which are integral with edge regions of the upper and lower ski laminations to define therewith a complete integral shell which requires no true finishing operation and which surrounds the interior of the cellular core.

The apparatus of the invention includes a mold having a pair of relatively narrow opposed side walls which are permanently fixed with a relatively wide mold wall while an opposed relatively wide mold wall is movable to and from an operating position where the mold is closed, the mold including means for fixing the upper and lower ski laminations in the interior of the mold so that the foamable plastic can be injected between these upper and lower laminations. The mold is preferably inclined downwardly with respect to the horizontal in the longitudinal forward direction so that the ski defining components point downwardly or, in other words, the front end of the ski is at a lower height then the heel or rear end of the ski. In this manner the foamable plastic material will positively flow by gravity action into the reduced area tip portion of the ski thereby assuring the minimizing of the formation of casting defects in the foamed core material.

According to the method of the invention the upper ski lamination is first introduced into the mold, preferably fixed in position by way of an adhesive tape which adheres to the upper surface of the upper ski element as well as to an inner surface of a relatively wide mold wall. Thereafter, the mold is closed with the lower ski lamination having initially been properly positioned with respect to the mold so as to be situated against an inner surface of the movable relatively wide mold wall. The various steps of the method of the invention are carried out in such a way and the different components of the ski are such that the results of the molding is a ski which when removed from the mold is completely finished insofar as surface treatment thereof is concerned.

BRIEF DESCRIPTION OF DRAWINGS

The invention is illustrated by way of example in the accompanying drawings which form part of this application and in which:

FIG. 1 is a schematic longitudinal elevation showing a central part of mold of the invention as well as structure associated therewith;

FIG. 2 is a transverse section taken along II—II of FIG. 1 in the direction of the arrows and showing upper and lower ski laminations situated in the mold in preparation for receiving the foamed plastic;

FIG. 3 is a transverse section of a ski of the invention, the section of FIG. 3 illustrating that part of the ski which is manufactured in the part of the mold which is shown in FIG. 2;

FIG. 4 is a transverse section schematically illustrating another embodiment of an apparatus of the invention for carrying out the method of the invention;

FIG. 5 is a transverse section corresponding to the section of FIG. 2 but illustrating a prior art structure;

FIG. 6 is a transverse section illustrating the condition of a ski when removed from the mold of FIG. 5.

DESCRIPTION OF PREFERRED EMBODIMENTS

Figure 7:
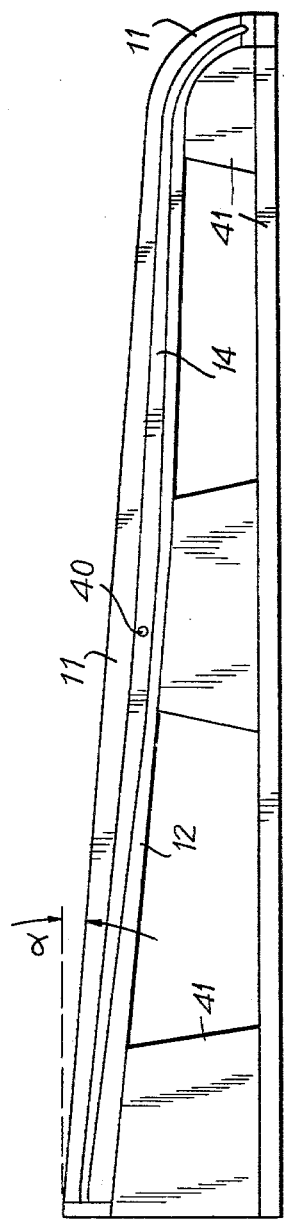
FIG. 7 is a schematic longitudinal elevation illustrating the entire length of the mold of the present invention which is tilted according to a feature of the invention.

Referring first to FIGS. 5 and 6 of the drawings, prior art expedients are illustrated therein. Referring to FIG. 5 it will be seen that the conventional mold illustrated therein includes loose relatively narrow side walls c and d made, for example, of steel and situated between while being spaced from the relatively wide upper mold wall a and lower mold wall b. The upper plastic ski lamination e is situated between the relatively narrow mold walls and the upper relatively wide mold wall a in the manner illustrated in FIG. 5, while the lower ski lamination f is situated between the lower mold wall b and the bottom end surfaces of the loose mold walls c and d. In this way the load-bearing ski laminations e and f are spaced from each other by the space S which forms the hollow interior of the mold cavity. Through a suitable pipe g extending through the mold wall d, a foam plastic is injected into the space S.

In order to be able to fix the ski laminations e and f reliably in the position shown in FIG. 5, these laminations have initially a width wider than their width in the finished ski, and of course these laminations also are wider than the core which is formed by the foamed plastic which cures in the space S. After the curing is completed, the mold of FIG. 5 is opened, and the structure removed from the mold is illustrated in FIG. 6.

As may be seen from FIG. 6, the foamed plastic core j has relatively dense opposed side portions h and i. However, the structure still retains the marginal portions k of the laminations e and f. It is necessary to remove these marginal portions k so that the upper and lower ski laminations will not extend laterally beyond the foamed plastic core j.

It is therefore essential to have with the structure shown in FIG. 6 a reinforced plastic-cutting machine, and as is well known, the operations in connection with removing the excess marginal portions k are exceedingly cumbersome. In fact this step of the conventional manufacturing process becomes the most inconvenient step in the entire manufacturing process, and it is precisely this step which has restricted any relative wide adoption of procedures as shown in FIGS. 5 and 6. In the event that the finishing is carried out by grinding or milling the side regions of the ski, then it is also exceedingly difficult to avoid damaging or destroying the dense shell portions h and i at the sides of the ski. Thus, one of the most important advantages achieved from the injected foamed plastic core is completely lost. These drawbacks have thus limited the extent to which procedures as shown in FIGS. 5 and 6 have been adopted, although in many respects it is possible by these procedures to achieve very important advantages over other known procedures as set forth above.

Thus, in accordance with the present invention a procedure of the type illustrated in FIGS. 5 and 6 has been further developed in such a way as to make it possible to achieve a ski with a foamed plastic core with the ski being completely finished subsequent to the injection of the plastic into the mold, requiring no subsequent machining steps while nevertheless the injection step will provide the above-mentioned dense side portions which together with the upper and lower ski laminations form an integral shell for the ski.

Referring now to FIGS. 1 and 2, it will be seen that the mold of the invention includes a relatively wide mold wall 12 forming the bottom wall of the mold in the illustrated example. The mold also includes relativey narrow side walls 13 and 14 which are permanently fixed with the relatively wide mold wall 12. For this purpose screws or bolts, 15,16, are utilized for fixing the walls 13,14 to the wall 12 in a permanent manner. Thus, with the mold of the invention instead of utilizing loose mold walls c and d as shown in FIG. 5, fixed side walls 13,14 are utilized, and in this way the ski manufacturing process can be carried out in a much quicker and far more convenient manner, while in addition the final product which is obtained is superior to that which can be obtained with the features shown in FIG. 5.

The mold of the invention also has a relatively wide wall 11 which is opposite to the wall 12 and which forms a cover or closure member for the mold, this wall 11 of course being movable to and from the operating position shown in FIGS. 1 and 2. When preparing the mold for operation, the relatively wide mold wall 11 is urged to the closed position shown in FIGS. 1 and 2 while being subjected to a closure force. The means which applies this closure force as well as the closing pressure acting at the mold wall 11 are schematically represented by the structure 17. For example, hydraulic or pneumatic assemblies capable of receiving a fluid under pressure are capable of being expanded against the upper surface of the wall 11 to urge the latter downwardly as indicated by the arrows in FIGS. 1 and 2.

The finished ski has a lower lamination 31 made of a suitable plastic which is reinforced at least at the load-bearing portions thereof, and in accordance with one of the important features of the invention this lower ski lamination 31 is situated during the molding operation against and extends along the inner surface of the relatively wide closure mold wall 11. Thus when the mold is oriented as shown in FIGS. 1 and 2, the lower ski lamination is situated at the upper part of the mold. According to a further feature of the invention it is preferred to have the lower ski lamination 31 wider than the upper ski lamination 32 which is also made of plastic material suitably reinforced at least at its load-bearing parts. Thus, the ski laminations 31 and 32 are made of a plastic material, such as polyethylene or polypropylene, which is suitably reinforced, as by suitable fibers which are embedded in and distributed through the plastic material of these laminations. In the finished ski these laminations form the outer laminations of the sandwich structure and in fact it is these laminations which take up the stresses encountered by the ski.

As is indicated in FIG. 2, the upper lamination 32 of the ski, consisting of reinforced plastic as set forth above, is fixed in the interior of the mold, extending along the inner surface of the relatively wide mold wall 12, this lamination 32 being situated between the relatively narrow mold walls 13 and 14 where the latter mold walls are fixed to the relatively wide mold wall 12. The interior of the mold at the region of the mold wall 12 and the side walls 13 and 14 fixed thereto conform to the configuration of the upper region of the completed ski. FIG. 1 illustrates the bevelled or slanting inner surface portions 12a of the lower wall 12 of the mold, these portions 12a being situated at the front and rear of the central part of the ski.

According to a further feature of the invention, the upper lamination 32 of the ski is preferably fixed to the inner surface of the mold wall 12 by utilizing an adhesive tape which carries a suitable adhesive material at its opposite faces. This tape 29 which is shown in FIG. 2 is initially adhered to that surface of lamination 32 which ultimately forms the top surface of the ski. Thus, the tape 29 serves to protect the top surface of the lamination 32 during the various manufacturing steps. Thus the upper surface of the upper lamination 32 may be surface treated so as to have its finished condition prior to the molding operation. For example, the upper surface of the upper lamination 32 may be silk-screen printed so as to be in a completely finished condition prior to the molding operations. In this way it is possible to achieve one of the important advantages of the invention in that after the molding operation is completed a completely finished ski is removed from the mold, requiring no further surface treatment. As mentioned above, such advantages cannot be obtained utilizing the prior art methods and apparatus exemplified by that described in U.S. Pat. No. 3,816,573.

According to a further feature of the invention, the mold includes a means for fixing the laminations in the mold in preparation for receiving the foamable plastic in the space between the ski laminations. The tape 29 of course forms the means shown in FIG. 2 for fixing the upper ski lamination 32 to the lower mold wall 12 at the inner surface of the latter. Thus because the tape 29 carries adhesive at both of its opposed faces, this tape 29 will adhere not only to the upper surface of the lamination 32 but also to the inner surface of the mold wall 12 thus forming a means for fixing the lamination 32 in the position illustrated in FIG. 2 in the interior of the mold.

The means for fixing the bottom ski lamination 31 in the mold includes upper inner regions of the narrow mold walls 13 and 14, these upper inner regions being formed with shoulders 18 extending longitudinally along the mold walls 13 and 14 as illustrated. It will be noted that the shoulders 18 have upwardly directed surfaces which slant downwardly and inwardly toward the interior of the mold. As was indicated above, the lower ski lamination 31 is wider than the upper ski lamination 32, and the width of the lamination 31 as well as the spacing between the walls 13 and 14 is such that the opposed side edge regions of the lamination 31 will rest on the shoulders 18 prior to application by way of the structure 17 of the pressure against the mold wall 11 to press the latter to its mold-closing position. It is seen that the side edge region of lower ski lamination 31 extends outwardly beyond the vertical inner walls of mold side walls 13 and 14. Thus, the lower ski lamination 31 is situated on the shoulders 18 in the position indicated in FIG. 2, and then the relatively wide mold wall 11 is applied to the upwardly directed surface of the lamination 31, and thereafter the closing pressure from the structure 17 is provided. The depths of the grooves 18 and thickness of lower ski lamination 31 are such that the outer surface of the latter is in a plane which is disposed outwardly of the plane defined by the upper edges of mold side walls 13 and 14. Thus, the configuration of the shoulders 18 and the thickness of the lamination 31 is such that when the closing pressure is applied to the mold wall 11 there remains between the upper surfaces of the mold walls 13 and 14 and the lower surface of the mold wall 11, as viewed in FIGS. 1 and 2, longitudinal gaps 20. As a result of this arrangement, during the molding operation the lower ski lamination 31 is tightly clamped at its side edge regions between the mold wall 11 and the shoulders 18 of the mold walls 13 and 14. It is apparent that because of this feature the lamination 31 will be reliably secured in this position during the molding operation. There is thus no possibility for any of the foamable plastic material moving outwardly beyond the edges of the lower ski lamination 31 to reach the outer surface thereof which was a problem in the prior art molding methods as described above. Thus by way of the above expedients it is possible to fix the ski laminations 31 and 32 reliably in position in the mold so as to define between these laminations the interior mold space 10 which is also defined between the inner surfaces of the relatively narrow mold walls 13 and 14.

At this time the space 10 can receive the foamable plastic which fills the space 10 in a well known manner. The foam plastic is supplied to the interior mold space 10, by way of the schematically illustrated structure 22 which is conventional and which communicates with the interior of the mold through a suitable pipe 21 extending through the side wall 14 of the mold. Suitable foam-plastic feeding apertures may also be situated, for example, at the ends of the mold. The inner surfaces of the mold walls 13 and 14 adjacent to the mold wall 12 are provided with bevels 19 which form the finished ski at its upper surface with downwardly and outwardly slanting edge regions. Any well known foamable plastic may be used for the ski of the invention as a suitable polyurethane or polyvinylchloride material. Such plastics with suitable foaming agents which are well known in the art are supplied to the interior of the mold to foam therein and expand against the inner side surfaces of the walls 13 and 14 as well as those surfaces of the lamination 31 and 32 which face each other. By virtue of the tape 29 being affixed to the outer surface of upper ski lamination 32 and the groove structure 18 described above, which permits a positive sealing contact to be obtained between the peripheral edge region of the lower ski lamination 31 and the sides of the mold side walls 14 and 14, there is no possibility for the foamable plastic material to inadvertently move onto the outer surfaces of either of the ski laminations 31,32.

After elapse of a suitable interval during which the injected foam plastic has cured so as to become solidified, the mold is opened and the finished ski is removed therefrom. This finished ski 30 has the features illustrated in FIG. 3. Thus, the ski 30 has the core 34 of foamed plastic with the bubbles or cells in the foamed plastic being distributed to a greater extent through the interior and central portion of the core, than at the opposed side portions 35 thereof. At these opposed side portions 35 the core has a greater density than the remainder of the core, and these denser outer side portions 35 of the core 34 extend between and are integral with the opposed side edges of the ski laminations 31 and 32. Inasmuch as the lower ski lamination 31 is wider than the upper ski lamination 32, the exterior side surfaces of the core slant outwardly to have the outwardly inclined surfaces 36 at the region where the core is integrally joined with the side edges 38 of the lamination 31. At the lower surface of the lower lamination 31 a bottom groove 33 has been provided to extend longitudinally of the ski, by suitable machining which preferably takes place prior to the molding operations described above and shown in FIG. 2. The dense side portions 35 of the core 34 not only slant downwardly and outwardly at the portions 36, but in addition they slant upwardly and inwardly at the portions 37 which are integral with the opposed side edges of the upper lamination 32, these slanting portions 37 being the result of the inclination of the upwardly directed surfaces 19 of the mold. In this way the finished ski has an integral shell completely surrounding the cellular part of the core, and this outer shell does not require any machining or subsequent treatment after this structure is removed from the mold.

FIG. 4 schematically illustrates an embodiment of the invention which is not as favorable as that of FIG. 2 so that the embodiment of FIG. 2 is preferred to that of FIG. 4. According to the embodiment of FIG. 4, the ski laminations 31 and 32 are secured to the interior of the mold by way of the action of a vacuum. For this purpose the mold walls 11 and 12 are provided with openings 24 passing therethrough, these openings 24 communicating through pipes 25 and valves 26 with a vacuum pump 27. This type of vacuum fixing may be used to secure either one or both of the ski laminations 31 and 32 in the interior of the mold respectively next to and extending along the walls 11 and 12 as pointed out above. Preferably, however, the upper ski lamination 32 is secured to the inner surface of the mold wall 12 by way of the tape 29 referred to above. With respect to the lower ski lamination 31, the suction resulting from the vacuum may be utilized while at the same time the actual fixing may still be carried out by way of the situation of the side edges of the lamination 31 in the grooves defined by the wall 11 and the shoulders 18, described above.

As is apparent from the above, in accordance with the method of manufacturing a ski according to the invention, the upper ski lamination 32 is machined in advance so as to have a width equalling the width of the inner surface of the mold wall 12 where it extends between the mold walls 13 and 14. The completely finished lamination 32 is then covered at its upper surface by way of the adhesive tape 29 which is double-sticking in the sense that it has adhesive layers at its opposite faces. The upper ski lamination 32 is fixed in the interior of the mold after a suitable release paper has been removed from the outer adhesive surface of the tape 29.

In the same way, the lower ski lamination 31 has been machined prior to the molding operations so as to have a width consistent with the distance between the shoulders 18. This lower ski lamination 31 is situated in the mold resting on the shoulders 18 and then the mold cover 11 is placed in its mold-closing position. Injection of the foam plastic is thereafter carried out, using methods well known in the art, and the injection takes place either from the rear of the mold or from one side of the ski. After the foamed plastic has cured, the ski is removed from the mold by displacing the cover 11 to its mold opening position, so that subsequent to the removal of the ski from the mold the only additional step which is required to remove the tape 29 from the upper surface of the upper lamination.

By way of utilizing the tape 29 a number of advantages are achieved. Thus the upper lamination 32 may be ornamented, as by silk-screen printing, for example, and in other ways may be completely surface-finished prior to the molding operations because the surface finish is protected by the tape 29 during the machining and casting steps and the ski is lifted out of the mold in a fully completed condition, including the finishing thereof. Such results never before could be achieved in previously known ski-manufacturing methods.

Referring to FIG. 7, another feature of the present invention as illustrated wherein the mold structure is inclined downwardly at an angle α with respect to the horizontal in the longitudinal forward direction so that the front ends of the lower mold wall and top mold cover 12,11 which define the front tip of the ski are at a lower height than the corresponding mold sections which define the heel or rear end of the ski. Thus, the mold is supported by a base and supporting section 41 which define a downwardly sloping upper support surface in which the mold is carried. An intake aperture 40 through which the foamable plastic material is injected into the mold cavity is located in the central part of the mold side wall. It has been found that by utilizing this technique, gravity action is advantageously employed whereby the foamable plastic material will positively fill the forward tip portion of the ski. This obviates the drawback present in prior art methods whereby casting defects in the form of cavities formed in the foamed core are often present in the tip portion of the ski which often resulted in failure of the ski during use. The angle of declination α of the mold is preferably less than 30° whixh allows for sufficient gravity feed of the foamable plastic into the tip portion while still allowing the foamable plastic material to flow upwardly into the rear portion of the mold.

Preliminary trails and tests of the ski, apparatus, and method of the invention have demonstrated that all of the above advantages are verified. In addition, the use of the tape 29 to secure the upper ski lamination in the interior of the mold provides an efficient prevention of penetration of the foam plastic between the ski lamination 32 and the inner surface of the mold wall 12. The utilization of a vacuum for securing the ski laminations 31 and 32 may indeed be restricted by the fact that the differential pressure tends to drive foam plastic through even the smallest cracks or points of leakage to the vacuum side, and as a result blocking of the vacuum pipe system 25 may occur.

Of course, as pointed out above, a further important advantage of the invention resides in the fact that it is possible to utilize a mold having fixed relatively side walls 13 and 14. Furthermore, since the upper ski lamination, which has a width smaller than the core, is first introduced into the mold and only thereafter the wider lower ski lamination is situated at the mouth of the mold, utilizing the shoulders 18, the result is a manufacturing procedure which is expedient in all respects. At the same time a highly advantageous mold is provided, and in addition it is possible to achieve from the molding a fully completed ski which among other advantages has the advantage that the finished ski is provided at its lower side regions over its entire length with marginal shoulders which enable the remainder of the ski to be relieved with respect to the shoulders so as to provide a ski which from an aesthetic point of view is very pleasing.

Of course, the invention is not narrowly confined to the details set forth above and shown in the drawings. Although in the above specific examples the bottom mold wall 12 and the upper mold wall 11 have been referred to, it is to be understood, that, for example, the mold shown in FIG. 2 may, if required, be oriented in such a way that it is turned through 90° from the position shown in FIG. 2. In fact it is possible to completely invert the mold of FIG. 2 in its operating position, although with such an arrangement the fixing of the upper ski lamination 32 in the interior of the mold may be rendered more awkward.

In addition, the positioning of the lower mold lamination 31 at the mouth of the mold may take place in ways different from utilizing shoulders 18 of the mold walls 13 and 14. For example, it is possible that the mold wall 11 is provided with special members to which the lamination 31 is fixed. Thus, the invention is not intended to be confined in any way to the specific embodiments presented above only by way of example, and details of the ski of the invention, including the method of manufacturing the same and the mold utilized, may be modified even to a considerable extent within the scope of the invention concept defined by the claims which follow.

What is claimed is:

1. A method for manufacturing a ski having upper and lower plastic laminations and a foamed plastic core situated between and bonded to said laminations in a mold having side surfaces defining an elongate mold cavity having a front end region which extends downwardly so as to form an upwardly extending front ski tip portion and a rear end region for forming the rear ski portion, comprising the steps of situating the upper lamination in the interior of a mold next to and extending along the lower inner surface of the mold, situating the lower lamination in the interior of the mold in spaced overlying relationship to said upper lamination, with said mold having opposed inner side surfaces extending between side edges of the laminations situated in the mold, and injecting into the spaces between said laminations and said mold side surfaces a foamable plastic which foams and cures in the interior of the mold while forming a foamed core having next to said side surfaces of the mold dense side portions which become integral with the laminations and define therewith a shell in which the foamed core with an interior portion of lesser density than said side portions thereof is situated, and removing from the mold said ski in a completely finished condition having said laminations bonded to said foamed core.

2. A method as recited in claim 1 and wherein the upper ski lamination is first introduced into the mold next to said lower inner surface thereof, the mold having a separate upper wall for closing the mold and against which the lower lamination is located.

3. A method as recited in claim 2 and wherein prior to introducing said upper lamination into the mold an adhesive tape having adhesive on both sides is adhered to the outer surface of the latter lamination which faces the lower inner surface of the mold and with the adhesive tape also adhering to the lower inner mold surface for holding the upper lamination in position in the mold.

4. A method as recited in claim 3 and wherein the surface of the upper lamination against which the adhesive tape is placed is completely finished prior to adhering the adhesive tape thereto so that the adhesive tape protects the finished surface of the upper lamination.

5. A method as recited in claim 1 and including the step of holding at least one of the laminations in position in the mold by vacuum.

6. A method as recited in claim 1 comprising the further step of positioning the mold so that said mold cavity forms an angle with respect to the horizontal such that said front ski portion forming end region of the mold is lower than the rear ski portion forming end regions of the mold.

7. The method of claim 6 wherein said angle is less than about 30°.

8. A mold for molding a ski having upper and lower laminations and a core of foamed plastic situated therebetween and forming a sandwich construction therewith, comprising opposed relatively wide upper and lower elongate mold wall members having a pair of longitudinal end regions for forming the front and rear ski portions and a pair of opposed relatively narrow elongate mold side wall members situated between said upper and lower wall members, said side wall members being permanently fixed to said lower wall member while said upper wall member is movable to and from an operative position with respect to the side wall members defining therewith and with said lower wall member a mold cavity the cross-sectional configuration of which corresponds to the cross section of the finished ski in the upside down configuration, said upper mold wall member having an inner surface facing said lower mold wall member and having a configuration which corresponds to that of the lower lamination so that the latter can be placed contiguous therewith prior to injection of a foamable plastic into the mold cavity, while said mold side wall members are spaced from each other at their regions which are fixed to said lower mold wall member by a distance suitable for receiving between them the upper ski lamination, and wherein said lower mold wall member has an inner surface facing said upper mold wall member and has a configuration which corresponds to that of the upper lamination so that the latter can be placed contiguous therewith prior to injection of the foamable plastic into the mold cavity to form the core between said laminations, said end regions of said upper and lower wall members which form the front ski portion extend downwardly to define a ski front tip portion which extends upwardly when the ski in its right side up configuration, and means for fixing said laminations in the interior of the mold with the lower lamination engaging and extending along said inner surface of said upper mold wall member and with the upper lamination situated between the mold side wall members at the region where they are permanently fixed to said lower mold wall member.

9. The combination of claim 1 and wherein said means for fixing said upper lamination in said mold between said relatively narrow mold side wall members next to said lower wall member includes a layer of adhesive tape having adhesive on both sides adhering on the one hand to said upper lamination and on the other hand to the inner surface of said lower mold wall member.

10. The combination of claim 1 and wherein said means for fixing said upper lamination to the lower mold wall member includes a suction means acting through the lower mold wall member.

11. The combination of claim 1 and wherein the means for fixing the lower lamination in said mold in engagement with the inner surface of said upper mold wall member includes portions defined at the upper ends of said side wall members situated next to said upper wall member, said upper end portions defining interior longitudinal shoulders defining with said upper mold wall member grooves for receiving opposed edge regions of the lower ski lamination which is wider than the upper ski lamination situated adjacent said lower mold wall member, and said mold including means for pressing said upper mold wall member toward said mold side walls for clamping the opposed side edge regions of the lower lamination against said shoulders.

12. The combination of claim 4 and wherein said shoulders and the thickness of the lower lamination pressed against the same are such that a gap remains between said upper mold wall member and the side mold wall members when the lower ski lamination has its edge regions clamped against said shoulders.

13. The combination of claim 1 and wherein the means for fixing the laminations in the mold includes a vacuum means cooperating with said upper mold wall member for holding a lamination against said inner surface thereof by suction.

14. The combination of claim 1 wherein the longitudinal axes of said mold cavity forms an angle with respect to the horizontal such that said front ski portions forming end region of said wide mold walls are lower than the rear ski portion forming end region of said wide mold walls.

15. The combination of claim 14 when said angle is less than about 30°.

16. The combination of claim 1 wherein said lamination fixing means are located outside of said mold cavity without any portions thereof projecting thereinto, in a manner such that said fixing means do not interfere with the casting of a substantially finished ski.

* * * * *